US007926535B2

(12) United States Patent
D'Amato

(10) Patent No.: US 7,926,535 B2

(45) Date of Patent: Apr. 19, 2011

(54) TOOL

(75) Inventor: Gianfranco D'Amato, Arzano (IT)

(73) Assignee: Seda S.p.A., Arzano Napoli (IT)

( * ) Notice: Subject to any disclaimer, the term of this patent is extended or adjusted under 35 U.S.C. 154(b) by 834 days.

(21) Appl. No.: 11/635,217

(22) Filed: Dec. 7, 2006

(65) Prior Publication Data

US 2007/0137030 A1 Jun. 21, 2007

(30) Foreign Application Priority Data

Dec. 12, 2005 (DE) ..................... 20 2005 019 396 U

(51) Int. Cl.
*B32B 37/00* (2006.01)

(52) U.S. Cl. ....................................... 156/498; 156/581

(58) Field of Classification Search .................... 156/69, 156/498, 580, 581, 583.1
See application file for complete search history.

(56) References Cited

U.S. PATENT DOCUMENTS

| | | | | |
|---|---|---|---|---|
| 4,571,233 | A * | 2/1986 | Konzal | 493/109 |
| 6,739,367 | B1 * | 5/2004 | Totani | 156/498 |
| 2006/0094577 | A1 * | 5/2006 | Mannlein et al. | 493/52 |

* cited by examiner

*Primary Examiner* — James Sells

(74) *Attorney, Agent, or Firm* — Fish & Richardson P.C.

(57) ABSTRACT

A tool for pressing lower rim section of a receptacle wall and a receptacle bottom comprises an inner tool part and an outer tool part. The outer tool part essentially surrounds the receptacle at its lower end. The inner tool part comprises tool segments that are moveable relative to the outer tool part between a retracted and a pressing position, wherein in the pressing position the lower rim sections are pressed together by opposed pressing surfaces of outer tool part and inner tool part. To avoid any contamination of the pressing surfaces and also delamination of the lower rim section of the receptacle, at least one groove is formed in the pressing surface of the tool segment and/or of the outer tool part.

17 Claims, 4 Drawing Sheets

TOOL

RELATED APPLICATION

Priority is claimed under 35 U.S.C. §119 to German Patent Application No. 20 2005 019 396.8 filed on Dec. 12, 2005. The entire contents of the priority application are incorporated herein by reference.

BACKGROUND OF THE INVENTION

For the production of cup-shaped receptacles comprising at least a receptacle wall and a receptacle bottom, a tool is used for pressing lower rim sections of receptacle wall and receptacle bottom together. The tool has an inner tool part and an outer tool part. The outer tool part essentially surrounds the receptacle at its lower end and is arranged outside of the receptacle. The inner tool part comprises a number of tool segments that are movable relative to the outer tool part between a retracted and a pressing position. In the retracted position it is possible to arrange corresponding rim sections between outer tool part and inner tool part. Then, the tool segments are moved in direction to the outer tool part and when the pressing position is arrived by the tool segments the lower rim sections of the receptacle wall and receptacle bottom are pressed together by opposed pressing surfaces of the outer tool part and the tool segments of the inner tool part. For a certain period of time, the corresponding lower rim sections are pressed together and then the tools segments are moved back to the retracted position and the receptacle is replaced by another receptacle for again pressing the corresponding lower rim sections together.

To securely fix the corresponding lower rim sections by such pressing, some kind of gluing or sealing substance is arranged, at least between those corresponding lower rim sections and, in particular, on surfaces of the rim sections that come into contact with each other by the pressing of the corresponding tool. Such a gluing or sealing substance may be a cold or hot glue or may also be a heated resin or resin layer applied to corresponding surfaces of at least one lower rim section. An example for such resin material is polyethylene, which is particularly used for receptacles made of paper or cardboard to provide some kind of sealing of the corresponding receptacle wall or receptacle bottom. Such resin material is heated at least up to its melting point.

When such gluing or sealing substance is able to flow during the pressing of the corresponding tool part, it can be squeezed by the tool part to be expelled to outer surfaces of the corresponding lower rim sections where the gluing or sealing substance may also adhere to the corresponding tool parts. Consequently, the corresponding gluing or sealing substance may contaminate the pressing surfaces of the tool parts. Such contamination may deteriorate the further operation of the tool parts and may also pollute the corresponding rim sections on the outer surfaces such that the outer appearance of the finished receptacle is negatively influenced. Furthermore, the gluing or sealing substance in contact with the pressing surfaces may at least partly harden during the pressing of the rim sections, such that when removing the inner tool part to the retracted position, delamination of the rim sections is caused. Such a delamination is generally detrimental in view of the sealing of the corresponding lower rim section that should be obtained by pressing the corresponding tool parts together with the lower rim sections therebetween.

SUMMARY OF THE INVENTION

It is an object of the present invention to improve such a tool in that any contamination of the pressing surfaces and also delamination of the lower rim section of the receptacle is avoided.

The object is solved by a tool with the features of claim 1.

According to the invention, at least one groove is formed in the pressing surface of a tool segment of the inner tool part and/or of the outer tool part.

By such a groove, a part of the corresponding lower rim section to which the groove is assigned in the pressing position will not or only slightly be compressed or pressed, such that there is an area in the corresponding lower rim section to which the gluing or sealing substance may flow induced by the pressing of the corresponding tool parts.

To not influence the outer appearance of the finished receptacle by any markings made by such gluing or sealing, it might be considered to only arrange the at least one groove on the corresponding pressing surface of the inner tool part or corresponding tool segments.

The corresponding tool segments are adapted with respect to the cross section of the bottom of the receptacle. In case the bottom has a circular cross section, also the corresponding inner tool part will have a corresponding cross section at least approximated by the corresponding pressing surfaces of the tool segments. In case the bottom has a square cross section, the corresponding cross sections of the inner tool and its tool segments will be analogous.

In particular in view of a circular cross section of the corresponding bottom part, it is advantageous in case each tool segment has a cross section of essentially the form of a sector of a circle. Depending on the corresponding angle assigned to each sector of a circle, there may be two, three, four or more tool segments.

To support the hardening of the corresponding gluing or sealing substance and to also prevent any heating of the tool, it is recommendable that inner and/or outer tool parts are cooled, in particular water-cooled.

As the corresponding tool segments of the inner tool will press against the lower rim sections, it is also possible that each tool segment is directly cooled.

The construction of the tool is simplified, in case the corresponding tool segments are arranged in particular with equal cross sections and in case each is movable between the retraction and the pressing positions, wherein generally four tool segments are sufficient.

In particular in view of a circular cross section of the corresponding bottom part of the receptacle, it is advantageous when the inner tool part is rotatably supported. This means that corresponding tool segments are moved in pressing position to press corresponding lower rim section together with cooperation of the outer tool part. However, if such tool segments are moved in the pressing position, there will generally be some gap between adjacent tool segments where it is not possible to press the lower rim sections against the outer tool part. To also apply corresponding pressure to those parts, the inner tool part will be rotated by a specific angle, in particular 45°, after the tool segments have been removed to the retracted position and after this rotation of the inner tool part the tool segments will again be moved to the pressing position to also press those parts of the lower rim section that were not pressed during the first rotational position of the inner tool part. Generally, it is only necessary to rotate the inner tool part between two rotational positions spaced 45° to cover all lower rim section with the corresponding pressing surfaces of the tool segments.

It is not necessary to rotate the inner tool back to the first rotational position as corresponding second rotational position may be used as the new first rotational position and then the tool will be rotated again, such that for each receptacle only one rotation of the inner tool part is necessary.

It is possible that a corresponding groove is inclined with respect to a corresponding horizontal surface which means that the groove may, for example, extend over a corresponding height of the tool segment from one lateral end to the other lateral end of this segment. Of course, the corresponding groove may also end in a distance to the corresponding lateral ends of the segment and also in a distance to upper and lower surfaces of this segment. In case such an inclined groove is used, there is still the possibility that some amount of the gluing or sealing substance will be pressed to upper or lower edges of the corresponding rim sections and then be squeezed to the outside of this rim section to again contaminate the outer surface of the rim section or the tool. To better prevent such squeezing of the gluing or sealing substance, the groove may essentially extend in horizontal direction perpendicular to longitudinal axis of the receptacle. For such a groove arrangement, corresponding gluing or sealing substance will not be squeezed in direction of upper or lower edges of the rim section.

It is conceivable that at least the lower and upper grooves are arranged above each other in direction of longitudinal axis of the receptacle, such that both of those grooves may be used for accommodating any gluing or sealing substance that is squeezed by pressing the inner and outer tool parts together and to more securely prevent any squeezing of the gluing or sealing substance to the outside of the rim sections.

Of course, lower and upper groove may be inclined to each other or may also be arranged displaced to each other in peripheral direction of the corresponding tool segment. According to one embodiment of the invention, lower and upper grooves are parallel to each other and have the same length.

Also in case of two of such grooves, it might be recommendable that those extend in horizontal planes parallel to upper and/or lower surfaces of the tool segments, such that the corresponding grooves do not guide any gluing or sealing substance to upper or lower edges of the rim sections.

Different cross sections for such grooves are possible. In view of manufacturing of such grooves by grinding or the like, it may be considered that they have a curved cross section in particular in form of a segment of a circle.

Of course, each groove may have a different cross section.

The corresponding pressing surfaces may extend parallel to longitudinal direction of the receptacle, which means parallel to the vertical direction. It may also be an advantage when those pressing surfaces of outer and inner tools are inversely inclined in this direction, wherein pressing surface of the inner tool part may in particular be inwardly inclined from lower to upper surfaces of the corresponding inner tool part.

To provide some limiting means for the squeezing of the gluing or sealing substance in direction or along the groove, it is conceivable that the groove is closed at its ends and in particular with respect to upper and/or lower surfaces of tool segment.

BRIEF DESCRIPTION OF THE DRAWINGS

In the following an advantageous embodiment of the invention is illustrated in the figures and explained in the following description of the figures.

DESCRIPTION OF THE PREFERRED EMBODIMENT

Figure 1:
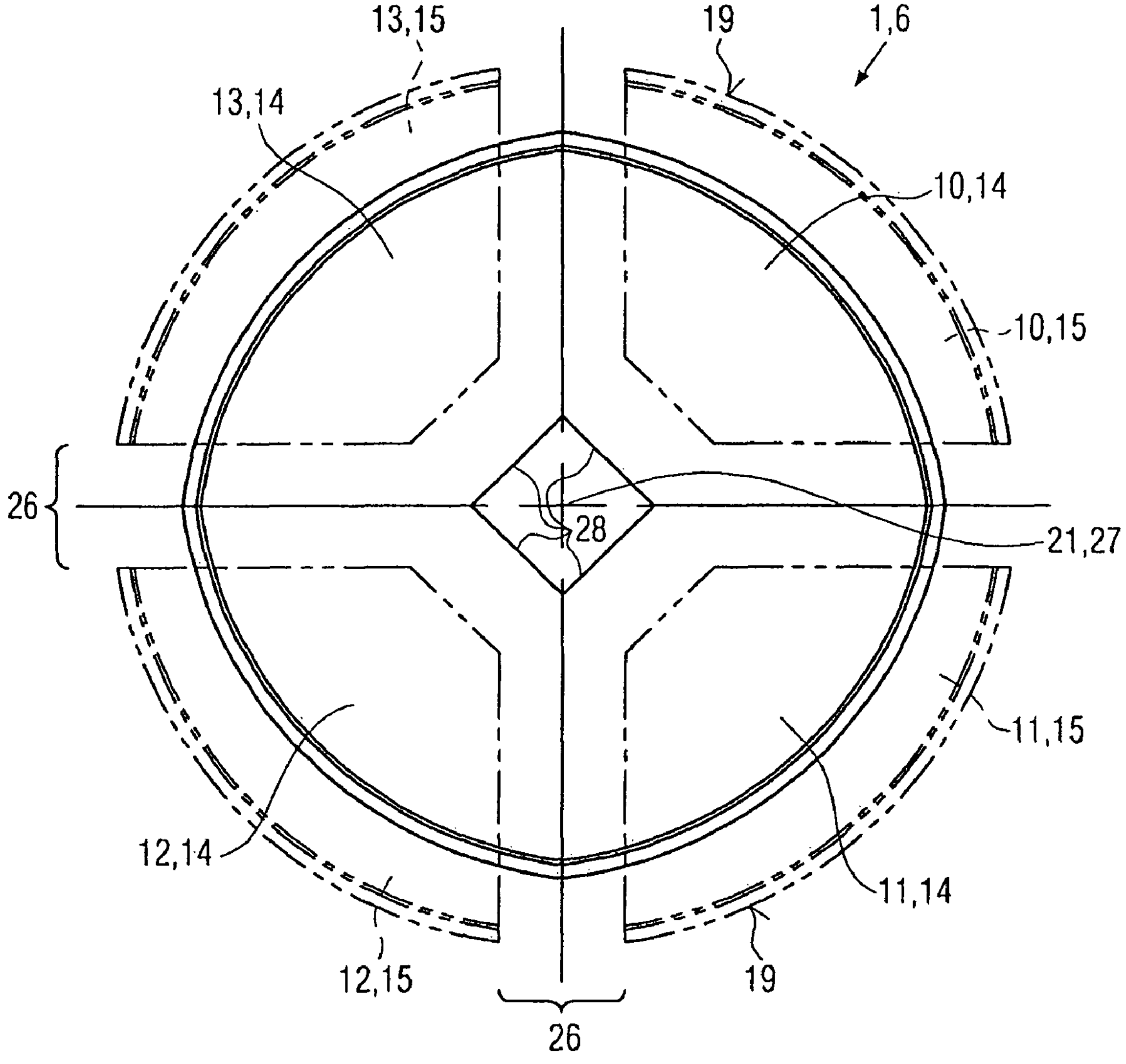
FIG. 1 shows a plane top view of an inner tool part of the tool.

In FIG. 1 a top plane view of one embodiment of tool 1, and in particular of inner tool part 6, is illustrated. The inner tool part 6 is divided in four tool segments 10 to 13 that are arranged in their retracted positions 14. Each tool segment 10 to 13 has a cross section of a sector of a circle with a center angle of about 90°. The corresponding tool segments all have the same cross section and are all movable in radial direction, see the corresponding tool segments 10 to 13 in their pressing position 15 illustrated with chain dotted line in FIG. 1.

Figure 5:
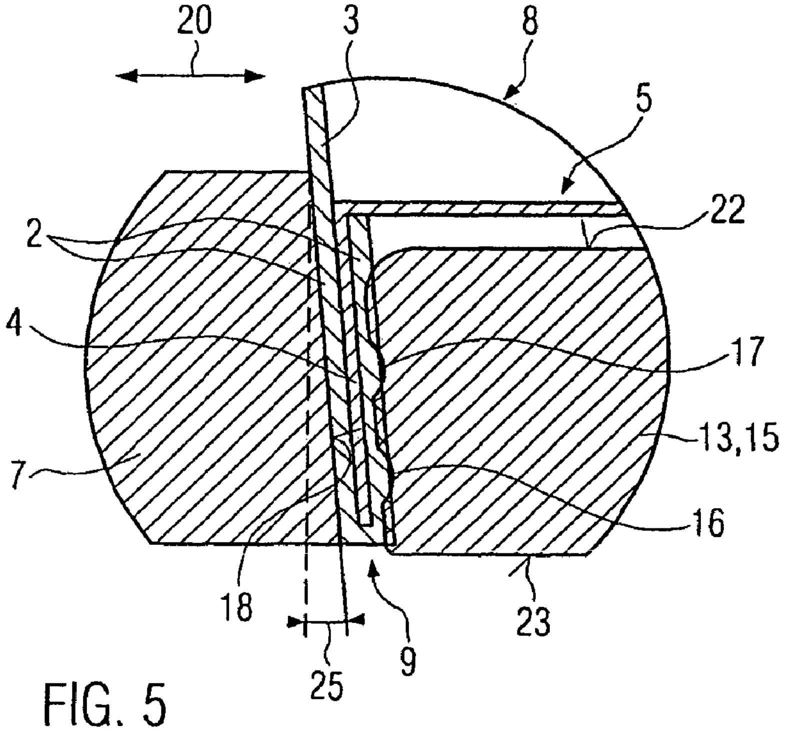
FIG. 5 shows a similar section to FIG. 4 with outer and inner tool parts and the latter one in pressing position.

The corresponding tool segments are displaceable in horizontal direction, see also reference numeral 20 in FIG. 5, perpendicular to corresponding vertical direction 27 which corresponds to a longitudinal axis 21 of a corresponding receptacle 8, see again FIG. 5.

Corresponding means for moving the tool segments are not illustrated in FIG. 1.

In their pressing position 15, the corresponding tool segments 10 to 13 are arranged in such a way that a gap 26 is formed between adjacent tool segments.

On the outer periphery of each tool segment, corresponding pressing surface 19 is provided, which will be further discussed in the following.

Corresponding end surfaces 28 of all tool segments 10 to 13 circumscribe in their retracted position 14 a squared inner part with vertical direction 27 or longitudinal axis 21 in the middle.

Figure 2:
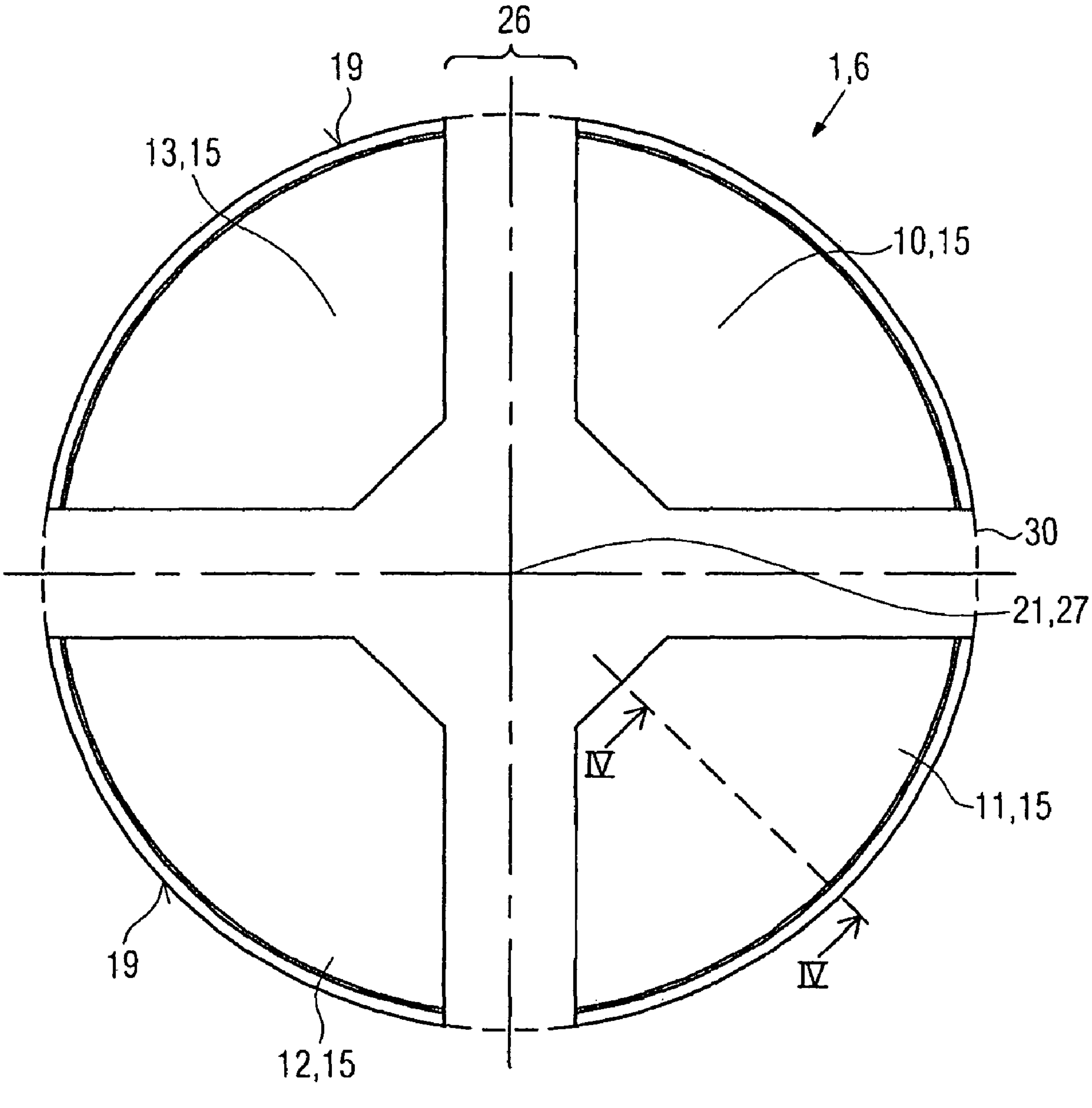
FIG. 2 shows the inner tool of FIG. 1 in pressing position of the tool segments.

In FIG. 2, the corresponding tool segments 10 to 13 are illustrated in their pressing position 15, see also the chain dotted line in FIG. 1, wherein corresponding tool segments 10 to 13 with their corresponding pressing surfaces 19 are arranged along a circle 30 with corresponding gaps 26 between adjacent tool segments.

Please note that in all the figures the same reference numerals are used for corresponding parts and that some parts will only be described with respect to one figure.

Figure 3:
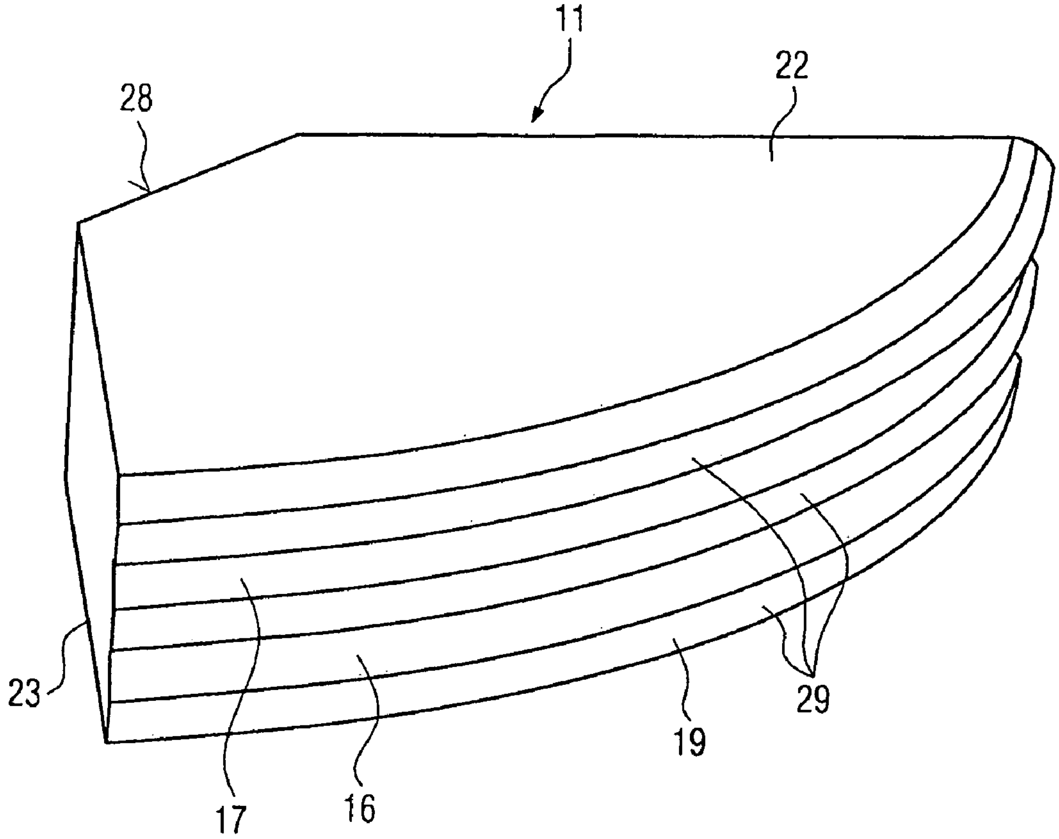
FIG. 3 shows a perspective lateral view of one tool segment with grooves.

FIG. 3 is a perspective side view of one tool segment 11 with corresponding pressing surface 19. In the pressing surface 19, two grooves 16 and 17 are provided, wherein groove 16 is a lower groove and groove 17 is an upper groove, in view of vertical direction 27 or longitudinal axis 21. Corresponding grooves 16 and 17 are parallel to each other and extend in corresponding horizontal planes perpendicular to vertical direction 27, see FIG. 2.

Between the two grooves and adjacent to upper and lower surfaces 22, 23 of the corresponding tool segment 11, the pressing surface 19 comprises stripe-like pressing sections 29 that extend along the corresponding grooves 16, 17.

Figure 4:
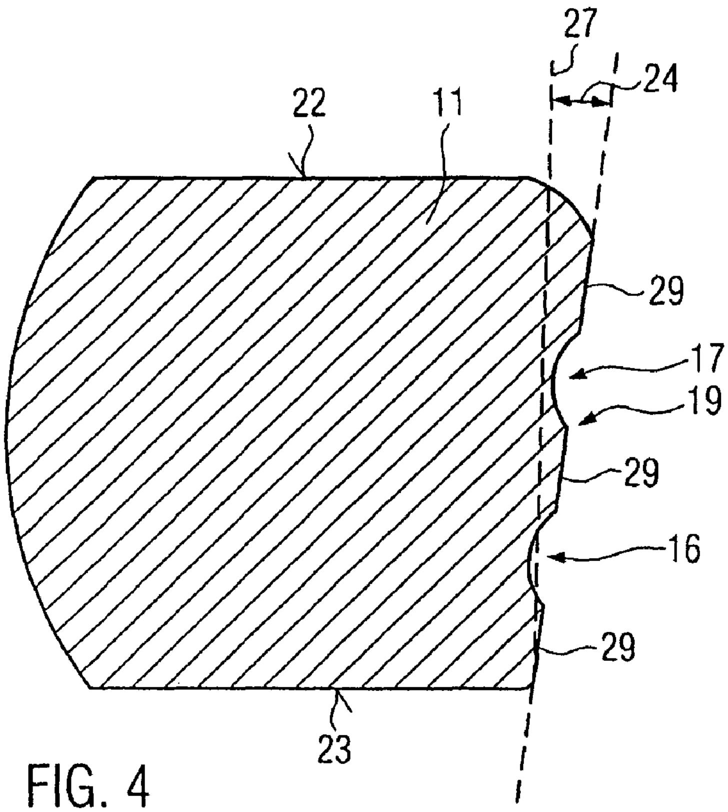
FIG. 4 shows a section along line IV-IV of FIG. 2.

FIG. 4 illustrates a cross section along line IV-IV of FIG. 2. The corresponding pressing surface 19 is inclined by an angle 24 with respect to vertical direction 27, wherein it is inclined outwardly from lower surface 23 to upper surface 22 of the corresponding tool segment 11. The cross section of the corresponding grooves 16, 17, is curved and, in particular, has the form of a segment of a circle.

It is also possible to arrange more than two grooves or also one or more grooves that are inclined with respect to a corresponding horizontal plane, wherein also those grooves may be parallel to each other.

It is further possible that the corresponding grooves terminals in a distance to corresponding side faces, see FIG. 3, of a tool segment, such that they are closed at their ends and that they are in particular closed with respect to upper and lower surfaces 22, 23 of the corresponding tool segment.

In FIG. 5, the cooperation of the inner tool part 6 with an outer tool part 7 of tool 1 according to the invention is illustrated. The outer tool part 7 is annular-like and comprises a central opening used for receiving lower end 9 of a cup-shaped receptacle 8. Such a receptacle comprises at least one receptacle wall 3 and a receptacle bottom 5. The receptacle may also be a double wall cup or the like. The material of wall and bottom is generally paper or cardboard with a resin layer, in particular on the inner surface of the receptacle wall and at least on the upper surface of the receptacle bottom 5.

The corresponding receptacle wall 3 is folded around a flange section of the receptacle bottom extending to the lower end 9, wherein corresponding parts of receptacle bottom 5 and receptacle wall 3 form lower rim sections 2 and 4. Those lower rim sections 2 and 4 are connected to each other for sealing the interior of the receptacle. As a corresponding gluing or sealing substance, a cold or hot glue or a resin layer, which is at least partially melted, can be used.

According to the invention, the corresponding tool 1 is used for pressing the lower rim sections 2 and 4 together which is realized by moving corresponding tool segments 10 to 13 in their pressing position 15, see also FIG. 2, in which corresponding pressing surface 19 of each tool segment presses corresponding rim sections 2 and 4 together in cooperation with pressing surface 18 of outer tool part 7.

The outer tool part 7 has also an inclined pressing surface 18, wherein corresponding pressing surfaces 18 and 19 of the tool part are inversely inclined. Consequently, pressing surface 18 of outer tool part 7 has an inclination inwardly directed from corresponding upper surface to corresponding lower surface of outer tool part 7 with an angle 25 of inclination which corresponds to angle 24 of the inversely inclined pressing surface of the outer tool part or of each tool segment 10 to 13.

According to FIG. 5, corresponding lower rim sections 2 and 4 are slightly compressed at least where the corresponding stripe-like pressing sections 29 of pressing surface 19 of corresponding tool segments 10 to 13 are arranged, whereas in the area of corresponding grooves 16 and 17 the rim sections are less or not compressed. Instead, those less or not compressed parts of the lower rim sections 2 and 4 are used for squeezing corresponding gluing or sealing substance to those areas such that any squeezing of the gluing or sealing substance to the outer surface of the rim sections is avoided.

To support the hardening of the gluing or sealing substance during the pressing and also to prevent any excessive heating of tool 1, inner and outer tool parts 6, 7 can be cooled, and in particular water-cooled. Such water-cooling is, for example, provided for each tool segment 10 to 13, but not explicitly illustrated in the figures.

Other kinds of cooling by air or the like are also possible.

According to the invention, it is possible to prevent any gluing or sealing substance from being squeezed out of the corresponding lower rim sections of receptacle wall and receptacle bottom such that there is no contamination of the pressing surfaces or of the outer surfaces of the receptacle. Corresponding tool segments 10, 13 are displaced from retracted position to pressing position, see FIGS. 1 and 2, and press corresponding rim section together by cooperation with pressing surface 18 of outer tool part 7. To also press the rim sections together where corresponding gaps 26 are formed between the tool segments 10, 13 in their pressing position, the inner tool part is 6 is slightly rotated about longitudinal axis 21 after the tool segments are again displaced in the retracted position and after this rotation the corresponding pressing surface 19 of the tool segments will be arranged where in the former rotational position corresponding gaps 26 were arranged. Then, the tool segments 10, 13 are again displaced in the pressing position 15 to also press rim sections 2 and 4 together where gaps 26 were previously arranged.

Moreover, also other cross sections of corresponding tool segments are possible, wherein the cross sections depend on the number of tool segments used and/or the cross section of the receptacle in the area of its bottom which also might be square, elliptical, or the like.

The invention claimed is:

1. A tool for pressing lower rim sections of a receptacle wall and a receptacle bottom together to form a receptacle, the tool comprising:

an inner tool part including a pressing surface and tool segments that are movable between a retracted position and a pressing position;

an outer tool part surrounding the receptacle at the lower rim sections and including a pressing surface that is opposed and facing the pressing surface of the inner tool part; and at least one groove formed in the pressing surface of at least one of the inner tool part and the outer tool part, the at least one groove being positioned intermediate lower and upper surfaces of the pressing faces and extending in a horizontal direction perpendicular to a longitudinal axis of the receptacle, wherein, in the pressing position, the tool segments are arranged such their corresponding pressing surfaces lie in a circular pattern and a gap exists between adjacent tool segments.

2. The tool according to claim 1, wherein each tool segment has a cross section corresponding to a particular part of the cross section of the receptacle bottom.

3. The tool according to claim 1, wherein at least one of the inner tool part and the outer tool part is cooled.

4. The tool according to claim 3, wherein each tool segment is cooled.

5. The tool according to claim 1, wherein the inner tool includes four tool segments having equal cross sections that are movable between the retracted position and the pressing position.

6. The tool according to claim 1, wherein the inner tool part is rotatably supported.

7. The tool according to claim 6, wherein the inner tool part is rotatable between two positions with an angle of 45° therebetween.

8. The tool according to claim 1, wherein the at least one groove includes at least a lower groove and an upper groove, the upper groove being arranged above the lower groove relative to the longitudinal axis of the receptacle.

9. The tool according to claim 8, wherein the lower and upper grooves are parallel to each other.

10. The tool according to claim 9, wherein the lower and upper grooves extend in the horizontal direction and are parallel to at least one of an upper surface and a lower surface of the tool segments.

11. The tool according to claim 1, wherein the at least one groove has a curved cross section.

12. The tool according to claim 1, wherein the respective pressing surfaces of outer and inner tool parts are inversely inclined.

13. The tool according to claim 1, wherein the at least one groove is closed at each end so that the at least one groove is entirely contained within the pressing face.

14. The tool according to claim 1, wherein the at least one groove is disposed on the inner tool and closed with respect to lower and upper surfaces of the tool segments.

15. The tool according to claim 2, wherein the cross section of each tool segment is formed as a sector of a circle corresponding to a circular cross section of the receptacle bottom.

16. The tool according to claim 3, wherein at least one of the inner tool part and the outer tool part is cooled by water.

17. The tool according to claim 12, wherein the pressing surface of the inner tool part is outwardly inclined with respect to the longitudinal axis of the receptacle from a lower surface to an upper surface of the inner tool part.

* * * * *